US008850134B1

(12) United States Patent
Murdock

(10) Patent No.: US 8,850,134 B1
(45) Date of Patent: Sep. 30, 2014

(54) METHOD AND SYSTEM FOR ALIGNING TRANSACTION SPLIT BOUNDARIES TO MEMORY BURST BOUNDARIES

(75) Inventor: Brett Murdock, Round Rock, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 331 days.

(21) Appl. No.: 13/457,336

(22) Filed: Apr. 26, 2012

(51) Int. Cl.
*G06F 12/02* (2006.01)
(52) U.S. Cl.
USPC ............. 711/154; 711/201; 710/35; 712/204
(58) Field of Classification Search
CPC .................................................. G06F 13/28
USPC ...................... 711/154, 201; 712/204; 710/35
See application file for complete search history.

(56) References Cited

U.S. PATENT DOCUMENTS

2013/0036246 A1* 2/2013 Lunadier ...................... 710/110

* cited by examiner

*Primary Examiner* — John Lane
(74) *Attorney, Agent, or Firm* — Sawyer Law Group, P.C.

(57) ABSTRACT

A system and method in accordance with the present invention provides for a solution benefiting from providing for non-duplicative access to data located in a system memory via the alignment of transaction sub-command breaking points with memory burst boundaries associated with the system memory, by creating a plurality of sub-commands for a transaction each having breaking points, identifying a plurality of memory burst boundaries for the system memory each having burst boundary points, and aligning a plurality of breaking points with a plurality of burst boundary points to provide single access to data located in the system memory.

31 Claims, 6 Drawing Sheets

200

400

METHOD AND SYSTEM FOR ALIGNING TRANSACTION SPLIT BOUNDARIES TO MEMORY BURST BOUNDARIES

FIELD OF THE INVENTION

A system and method in accordance with the present invention relates generally to the efficient use of shared memory resources and, more particularly, to aligning transactions in relation to associated memory data structure.

BACKGROUND OF THE INVENTION

In a typical computer-related apparatus, there is usually at least a system bus, system memory, a processor and a controller or application in communication with one another to affect the execution of certain data transactions for the device. In many of such computer and data processing systems, the main active memory is typically random access memory (RAM) and often is a dynamic random access memory (DRAM).

In such devices, it has become common for a data transaction to be sizeable such that the demand of the transaction access (e.g., command, read, write, store, etc.) may attempt to demand near exclusive utilization of the available shared memory resources in order to execute the particular data transaction. Though many system bus standards provide for a single command transferring a significant amount of data by a single operation, doing so may cause diminished system-level performance and cause other tasks to be handled late or with delay. The effect of such operations may result in serial-like performances of specific tasks for memory utilization which is unacceptable for effective device operations in today's environments. Accordingly what is needed is a system and method to address these issues.

SUMMARY OF THE INVENTION

A system and method in accordance with the present invention fulfills these needs and has been developed in response to the present state of the art, and in particular, in response to the problems and needs in the art that have not yet been fully solved by currently available technologies.

A system and method in accordance with the present invention provides for a method for providing non-duplicative access to system memory data in a memory device by creating a plurality of sub-commands for a transaction each having breaking points, identifying a plurality of memory burst boundaries for the system memory each having burst boundary points of predetermined memory burst data size, and aligning a plurality of breaking points with a plurality of burst boundary points to provide single access to data located in the system memory.

In one or more embodiments, a system and method in accordance with the present invention provides for a programmable controller configured for operable coupling to one or more requestors and one or more memory devices for providing non-duplicative access to system memory data for use by a memory controller of a memory device, the memory controller comprising processing means for: creating a plurality of sub-commands for a transaction each having breaking points, identifying a plurality of memory burst boundaries for the system memory each having burst boundary points of predetermined memory burst data size, and aligning a plurality of breaking points with a plurality of burst boundary points to provide single access to data located in the system memory.

In one or more further embodiments, a system and method in accordance with the present invention provides for a computer program product stored on a computer usable medium capable of communication with a memory device, comprising: computer readable program means for causing a computer to provide non-duplicative access to data located in system memory comprising the steps of: identifying a transaction to be processed and reducing the transaction into a plurality of sub-command portions where each sub-command portion has a starting break point and an ending break point, identifying a plurality of memory burst boundaries in relation to a system memory where each memory burst boundary has a burst starting point and a burst ending point being of a predetermined memory burst data size, aligning at least one or more starting breaking points with one or more burst starting points, and aligning at least one or more ending breaking points with one or more burst ending points to provide single access to data located in the system memory.

In one or more further embodiments, a system and method in accordance with the present invention provides for a memory device providing comprising a processor, memory controller, system memory, and system bus capable of communication with one another to affect the execution of one or more data transactions for the device for non-duplicative access to system memory data in the device, wherein the memory controller includes programmable computer logic to comprising the steps of: identifying a transaction to be processed and reducing the transaction into a plurality of sub-command portions where each sub-command portion has a starting break point and an ending break point, identifying a plurality of memory burst boundaries in relation to a system memory where each memory burst boundary has a burst starting point and a burst ending point being of a predetermined memory burst data size, aligning at least one or more starting breaking points with one or more burst starting points, and aligning at least one or more ending breaking points with one or more burst ending points to provide single access to data located in the system memory.

A system and method in accordance with the present invention provides for a solution benefiting from providing for non-duplicative access to data located in a system memory via the alignment of transaction sub-command breaking points with memory burst boundaries associated with the system memory.

Further embodiments, forms, objects, features, advantages, aspects, and benefits of the present application shall become apparent from the detailed description and drawings included herein.

DETAILED DESCRIPTION

The present invention relates generally to the efficient use of shared memory resources and, more particularly, to aligning transactions in relation to associated memory data structure. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
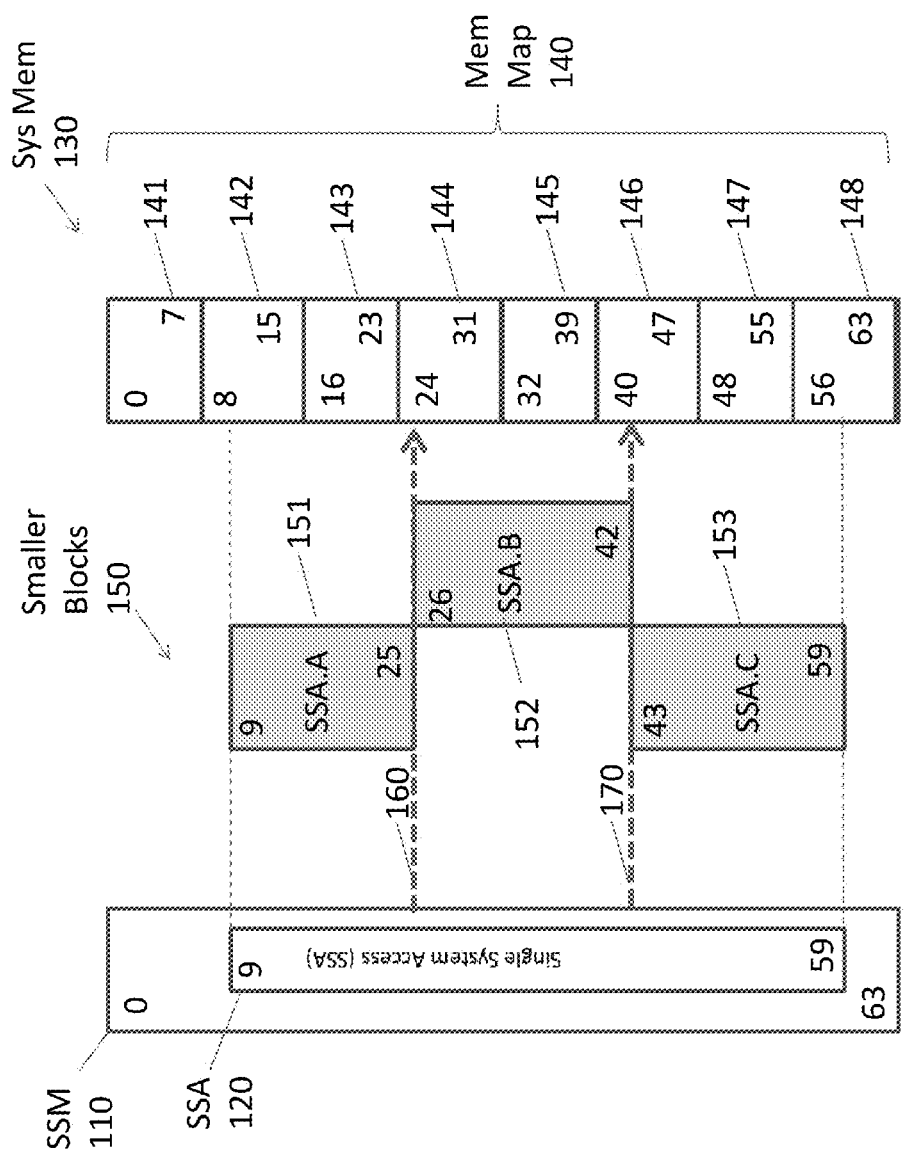
FIG. 1 depicts a known approach to attempt to mitigate such performance issues by apportioning a transaction into smaller defined parts, such as into user-defined boundary block sizes.

FIG. 1 depicts a known approach to attempt to mitigate such performance issues by apportioning a transaction into smaller defined parts, such as into user-defined boundary block sizes. When transactions (i.e., commands) are received it is known to attempt to break the single command into multiple smaller commands for a controller to execute in an attempt to provide for improved sharing of common resources, such as memory, in the system.

In FIG. 1, a system memory map (SMM) 110 having addresses from 0 to 63 includes a single system access (SSA) 120 beginning at address 9 and ending 50 bytes later at address 59. A system memory 130 having a memory map 140 with eight memory burst boundary (MBB) blocks (141-148) being defined as 8 bytes each (also herein as 8-beats). Under the suggested traditional approach discussed above, the transaction requiring the SSA 120 is sub-divided into smaller transactional blocks at 150. Each smaller transactional block is 16 bytes (151-153), with the option for any required remainder block having less than 16 bytes occurring thereafter (not shown). A user of the traditional approach may indicate a specific number of bytes to break a system command into or a specific beat number of data transfer to break the system command into. As used herein, the term "beat" is indicative of a unit having one more bytes, where, for instance a series of beats may be equivalent to a series of 8-byte breaks. Smaller transaction portion block 151 starts at address 9 and ends at address 25. Smaller transaction portion block 152 starts at address 26 and ends at address 42. Smaller transaction portion block 153 starts at address 43 and ends at address 59.

While such an approach may assist in reducing the system bus side bottleneck and offset the system-side demand for the shared memory for a single command, the approach creates additional challenges as each smaller 16-byte portion (i.e., smaller transaction portion block) now requires additional processing by the shared memory (i.e., duplicative accesses).

For example, from FIG. 1, the memory map 140 is constrained to access rules by a standard such as JEDEC (the standards body for DDR [double data rate DRAM] memory interfaces; http://www.jedec.org) which would require that a DDR device must always start an access on a burst of 8 boundary address. Block 142, where the 8 address starts, indicates that the access is to start at address 8 and end at address 15. However in viewing accesses required for the smaller transaction portion blocks SSA.A (151), SSA.B (152) and SSA.C (153), it will be appreciated then that using the traditional approach, commands associated with the reduced blocks 151-153 require two additional accesses at MBB blocks 144 and 146 resulting in wasted bandwidth and system resources.

By way of further explanation, since SSA.A (151) starts at address 9 and ends at address 25, access to MBB blocks 142, 143 and 144 are required to process the commands of the SSA.B block 152. By example, from FIG. 1, a break point for SAA.A 151 depicts a starting point at address 9 and an ending point at address 25. Since SSA.B (152) starts at address 26 and ends at address 42, access to MBB blocks 144, 145 and 146 are required to process the commands of the SSA.B block 151. Similarly, since SSA.C (153) starts at address 43 and ends at address 59, access to MBB blocks 146, 147 and 148 are required to process the commands of the SSA.C block 153. Therefore MBB blocks 144 and 146 are accessed at least twice to process the small blocks of 150 where these double access as highlighted at sight lines 160 and 170, respectively. As used herein the term "break point" is intended to mean a point or address at which small transaction portion or sub-command block begins or ends.

Such an approach, though compliant with a standard, is not optimal for most devices in today's environment as the apportionment of the original transaction occurs irrespective of the burst rate of the shared memory, resulting in the duplicative access potential. Further, as memory devices require larger blocks of data that are transferred in bursts and transacted in various commands (read, write, etc.); the traditional approaches are insufficient for achieving performance expectations. Such a traditional approach fails to adequately provide for generating transaction portions that may be processed without duplicative accesses or unnecessary memory bursts in relation to the associated memory map of the system memory of the device. Therefore, what is desired is a solution that overcomes the inefficiencies and shortcomings of the approaches of the prior art.

As used herein, the term "burst rate" is intended to mean a temporary high-speed data transmission mode that facilitates sequential data transfer at maximum throughput during a burst access mode. The burst access mode has a start and an end (i.e., a burst boundary) in which data bursts of a defined number of bytes may be transferred in a single memory operation to a memory, for instance. By example, from FIG. 1, a burst boundary for MBB 142 begins at address 8 and ends at address 15. It will be appreciated by those familiar with the art that burst mode functionality is device-dependent, does not require input from other devices, and that burst mode data transfer rate (DTR) speeds can be approximately two to five times faster than normal transmission protocols. A burst rate for memory, such as a dynamic random access memory (DRAM; e.g., DDR3) for instance, provides a burst access mode in which 8 bytes are burst within an 8-byte memory burst boundary and transferred during the single memory operation; such may also be referred to as 8-beat data bursts. Similarly, bursts of 16 bytes on predefined 16 byte boundaries are another alternative example. Typically DRAM memory is inclusive of logic that may operate as a counter that automatically accomplishes the burst transfer in accordance with a predetermined class of memory, standard, or other predefined logic. It will be appreciated by those skilled in the art that current and developing memory devices are expected to have more stringent requirements for the addresses at which access opportunities may be started or completed (e.g., JEDEC) and that the bandwidth available (i.e., performance) from one exemplary device is often less than that specified by system requirements.

It will be further appreciated that the structure of a DRAM is generally composed of a number of memory cells organized into banks. Each bank corresponds to an array of the memory cells with each cell being respectively associated with a digit of data (e.g., a bit) at a memory address. In particular, memory addresses within a bank are each designated by a row address and a column address, wherein each row address addresses a memory page. Each page of memory, therefore, contains several memory locations corresponding to the different column designations within the page.

As used herein the terms device, apparatus, system, etc. are intended to be inclusive, interchangeable, and/or synonymous with one another and other similar arrangements and equipment for purposes of the present invention though one will recognize that functionally each may have unique characteristics, functions and/or operations which may be specific to its individual capabilities and/or deployment.

Figure 2:
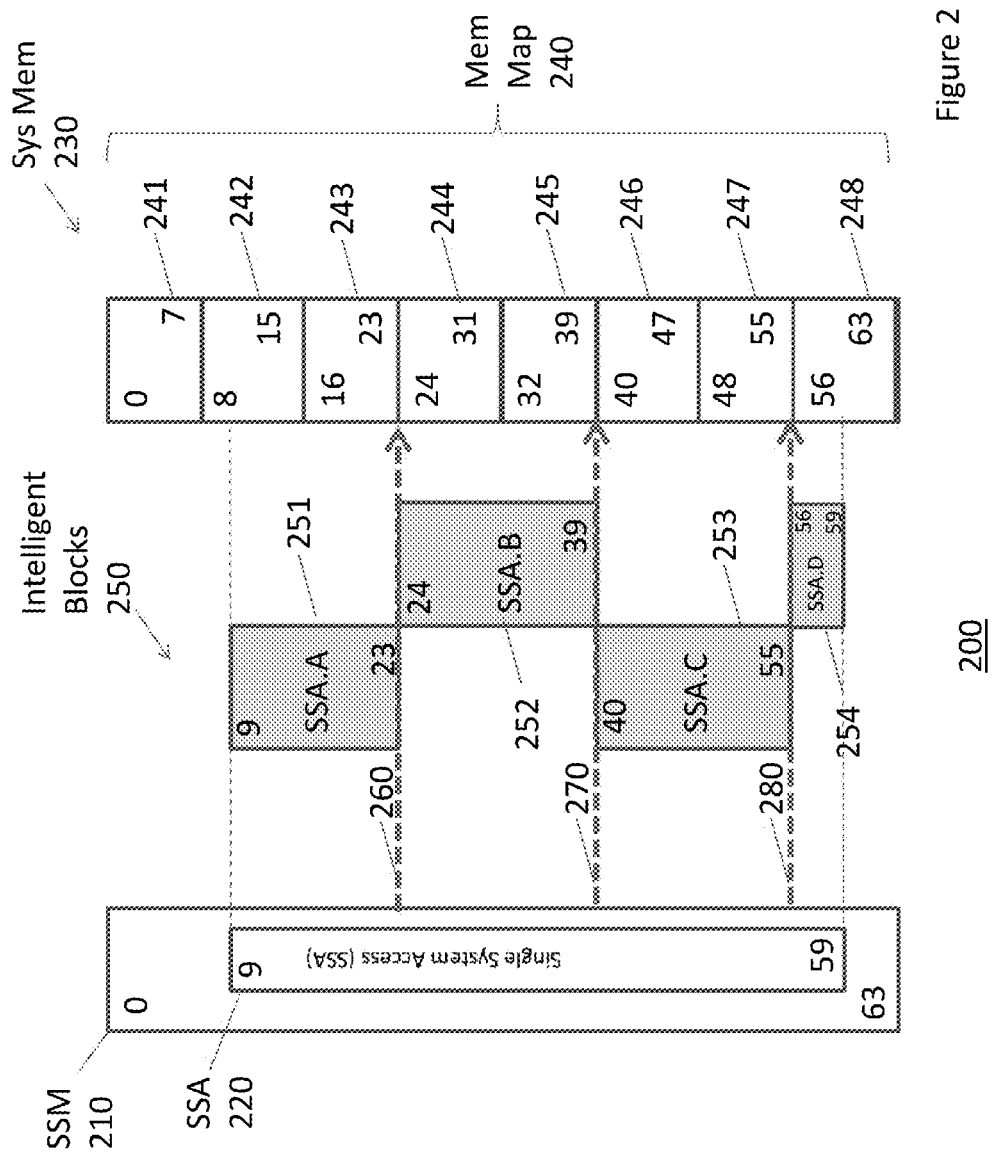
FIG. 2 illustrates an embodiment of the present invention depicting the alignment of transaction sub-command breaking points with system memory burst boundaries with burst boundary points.

FIG. 2 illustrates an embodiment of the present invention depicting the alignment of transaction sub-command breaking points with system memory burst boundaries with burst boundary points.

In FIG. 2, a system memory map (SMM) 210 having addresses from 0 to 63 includes a single system access (SSA) 220 beginning at address 9 and ending 50 bytes later at address 59. A system memory 230 having a memory map 240 with eight memory burst boundary (MBB) blocks (241-248) being defined as 8 bytes each. The transaction command to be processed requiring the SSA 220 is sub-divided into intelligently aligned transactional blocks at 250 where these sub-commands are of a data size to be determined based upon the memory burst boundary of the memory map 240, using a system and method in accordance with the present invention. Once the size of the sub-commands is determined, breaking points associated with the sub-commands may then also be determined during the alignment operation of the present invention so as to be optimally for use with the determined memory burst boundaries.

A system and method in accordance with the present invention determines a system memory 230 such as that of a DDR3. In the case of a DDR3, a system and method in accordance with the present invention recognizes that the JEDEC standards are associated with the DDR3 and a memory map 240 can be determined which is comprised of eight memory burst boundary (MBB) blocks (241-248) being defined as 8 bytes each. The associated burst starting points and burst ending points of each MBB block (241-248) are identified. For instance, for MBB 244, the burst starting point 24 and the burst ending point is 31.

A system and method in accordance with the present invention then using a predetermined value (as may be set by a user, instruction set, application, programmable controller, etc.) to identify the amount of data each transaction sub-command should contain, creates sub-commands from the identified original transaction. In one or more alternative embodiments, the number of memory bursts may also be determined as a preferred value for a size of a sub-command. It will be appreciated by those skilled in the art that the present invention is not requiring that each sub-command be of a set predetermined or predefined size, but rather that there is a preference of size that is being set forth under the process for any transaction may be of an overall size that may not be reduced equally into smaller sub-commands over the a preferential value.

From FIG. 2, sub-command transactional blocks are generated using the preferential value. For an embodiment, a predetermined value may include 2 MBBs, 16 beats, or 16 bytes as is depicted in FIG. 2 for transaction sub-command blocks 251-253, where the option for any required remainder block having less than 16 bytes is also provided for at 254. The remainder block of 254 is comprised of 3 bytes for the specific example.

Under a system and method in accordance with the present invention, now that the MBB burst points are determined and the transaction sub-command data sizes are determined, an alignment of the transaction sub-commands with the MBB burst points is performed to provide for non-duplicative access to the data in the system memory. To prevent duplicative access to the system memory, a system and method in accordance with the present invention aligns transaction sub-command starting and ending break points with the determined MBB starting burst and ending burst points, while attempting to preserve the preferential predetermined transaction sub-command data size. In so doing, A system and method in accordance with the present invention aligns starting break points of one or more transaction sub-commands with starting burst points of a MBB. A system and method in accordance with the present invention also aligns ending break points of one or more transaction sub-commands with ending burst points of a MBB. A system and method in accordance with the present invention also determines the arrangement of the content for each transaction sub-command in relation to the overall original transaction command such that a remainder transaction sub-command block (i.e., that having less than the preferential data content value) may be positioned as a first, last or other sequence-oriented block in the arrangement of the transaction sub-commands (250).

From FIG. 2, the transaction command (SSA) 220 is identified. In this embodiment, a first block SSA.A 251 is arranged with a starting break point of 9 and an ending break point of 23, where the ending break point is aligned with the ending burst point of MBB 243 and the block 251 includes 2 MBBs in scope. A second block SSA.B 252 is also arranged with a starting break point of 24 and an ending break point of 39, where the starting break point is aligned with the staring burst point of MBB 244 and the ending break point is aligned with the ending burst point of MBB 245. The block 252 includes 2 MBBs in scope. A third block SSA.C 253 is further arranged with a starting break point of 40 and an ending break point of 55, where the starting break point is aligned with the staring burst point of MBB 246 and the ending break point is aligned with the ending burst point of MBB 247. The block 253 includes 2 MBBs in scope. A fourth block SSA.D 254 is arranged with a starting break point of 56 and an ending break point of 59, where the starting break point is aligned with the staring burst point of MBB 244. As the SSA.D block is a partial content block, it is not the preferred 2 MBBs in scope but is arranged so as not to require a duplicative access to a memory location to process the sub-command.

In reviewing FIG. 2, it will be appreciated by those skilled in the art that a system and method in accordance with the present invention contemplated a non-duplicative approach by viewing highlighted arrows 260, 270 and 280. At arrow 260, the ending break point of the first sub-command block 251 is aligned with the ending break point of the MBB 243, thereby not requiring further access to MBB 243 as shown by arrow 260. At arrow 270, the ending break point of the sub-command block 252 is aligned with the ending break point of the MBB 244, and the starting break point of the block 252 is aligned with the starting burst point of MBB 244, thereby not requiring further access to MBB 244 or 245 as shown by arrow 270. Similarly, at arrow 280, the ending break point of the sub-command block 253 is aligned with the ending break point of the MBB 247, and the starting break point of the block 253 is aligned with the starting burst point of MBB 246, thereby not requiring further access to MBB 246 or 247 as shown by arrow 280.

Advantageously then, a system and method in accordance with the present invention provides for a solution benefiting from providing for non-duplicative access to data located in a system memory via the alignment of transaction sub-command breaking points with memory burst boundaries associated with the system memory.

Figure 3:
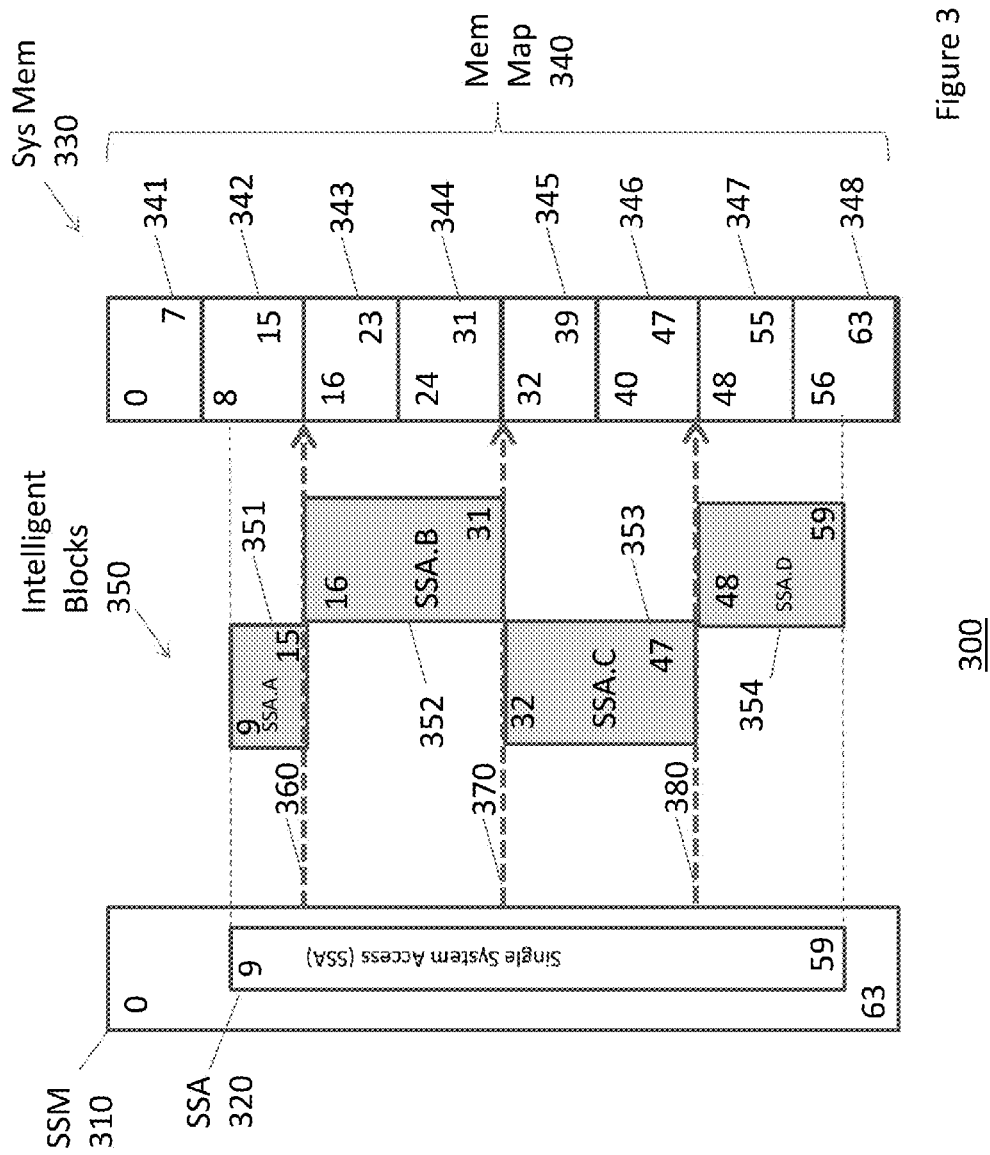
FIG. 3 illustrates a further embodiment of the present invention depicting the alignment of transaction sub-command breaking points with system memory burst boundaries with burst boundary points.

FIG. 3 illustrates a further embodiment of the present invention depicting the alignment of transaction sub-command breaking points with system memory burst boundaries with burst boundary points.

In FIG. 3, a system memory map (SMM) 310 having addresses from 0 to 63 includes a single system access (SSA) 320 beginning at address 9 and ending 50 bytes later at address 59. A system memory 330 having a memory map 340 with eight memory burst boundary (MBB) blocks (341-348) being defined as 8 bytes each. The transaction command to be processed requiring the SSA 320 is sub-divided into intelligently aligned transactional blocks at 350 where these sub-commands are of a data size to be determined based upon the memory burst boundary of the memory map 340, using a system and method in accordance with the present invention.

A system and method in accordance with the present invention determines a system memory 330 such as that of a DDR3. A memory map 340 is then determined which is comprised of eight memory burst boundary (MBB) blocks (341-348) being defined as 8 bytes each. The associated burst starting points and burst ending points of each MBB block (341-348) are identified. For instance, for MBB 344, the burst starting point 24 and the burst ending point is 31.

From FIG. 3, sub-command transactional blocks are generated using the preferential value. For an embodiment, a predetermined value may include 2 MBBs, 16 beats, or 16 bytes as is depicted in FIG. 3 for transaction sub-command blocks 351-353, where the option for any required remainder block having less than 16 bytes is also provided for at 351 and 354.

Now that the MBB burst points are determined and the transaction sub-command data sizes are determined, an alignment of the transaction sub-commands with the MBB burst points is performed to provide for non-duplicative access to the data in the system memory.

From FIG. 3, the transaction command (SSA) 320 is identified. A first block SSA.A 351 is arranged with a starting break point of 9 and an ending break point of 15, where the ending break point is aligned with the ending burst point of MBB 342 and the block 351 includes less than the desired preferred value but has an appropriate ending break point aligned with a ending burst point along arrow 360. A second block SSA.B 352 is also arranged with a starting break point of 16 and an ending break point of 31, where the starting break point is aligned with the staring burst point of MBB 343 and the ending break point is aligned with the ending burst point of MBB 344. The block 352 includes 2 MBBs in scope. A third block SSA.C 353 is further arranged with a starting break point of 32 and an ending break point of 47, where the starting break point is aligned with the staring burst point of MBB 345 and the ending break point is aligned with the ending burst point of MBB 346. The block 353 includes 2 MBBs in scope. A fourth block SSA.D 354 is arranged with a starting break point of 48 and an ending break point of 59, where the starting break point is aligned with the staring burst point of MBB 347. As the SSA.D block is a partial content block, is arranged so as not to require a duplicative access to a memory location to process the sub-command.

In reviewing FIG. 3, it will be appreciated by those skilled in the art that the present invention contemplated a non-duplicative approach by viewing highlighted arrows 360, 370 and 380. At arrow 360, the ending break point of the first sub-command block 351 is aligned with the ending break point of the MBB 342, thereby not requiring further access to MBB 342 as shown by arrows 360 and 370 respectively. At arrow 370, the ending break point of the sub-command block 352 is aligned with the ending break point of the MBB 344, and the starting break point of the block 352 is aligned with the starting burst point of MBB 343, thereby not requiring further access to MBB 343 or 344 as shown by arrows 360 and 370 respectively. Similarly, at arrow 380, the ending break point of the sub-command block 353 is aligned with the ending break point of the MBB 346, and the starting break point of the block 353 is aligned with the starting burst point of MBB 345, thereby not requiring further access to MBB 345 or 346 as shown by arrow 380.

Advantageously then, a system and method in accordance with the present invention provides for a solution benefiting from providing for non-duplicative access to data located in a system memory via the alignment of transaction sub-command breaking points with memory burst boundaries associated with the system memory, where the alignment of transaction sub-commands does not require each sub-command block to be of a particular order or content minimum.

Figure 4:
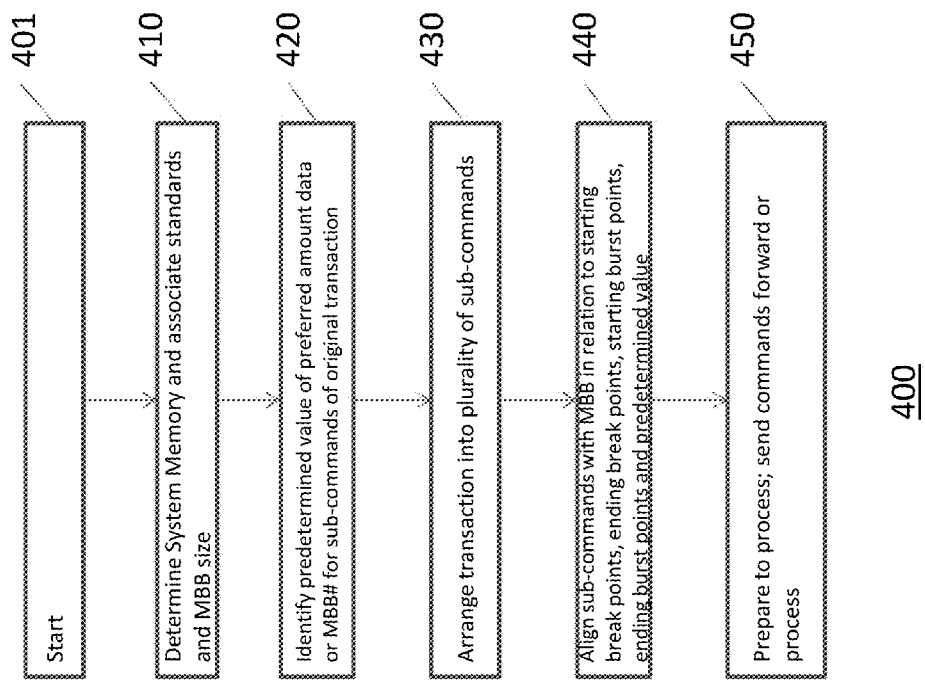
FIG. 4 is a flow diagram illustrating a method for efficiently accessing data located in memory using the present invention in a non-duplicative manner.

FIG. 4 is a flow diagram illustrating a method for efficiently accessing data located in memory using a system and method in accordance with the present invention in a non-duplicative manner.

From FIG. 4, a system and method in accordance with the present invention, in one or more embodiments, starts at 401 and determines a system memory at 410. In determining the system memory, a system and method in accordance with the present invention may also preferably perform a look-up operation to determine standards associated with the identified memory as well as determine a byte or beat size for associated MBBs of the memory. The determined associated burst starting points and burst ending points of each MBB block for the identified system memory may then be determined.

A system and method in accordance with the present invention then, in one or more embodiments, using a predetermined value (as may be set by a user, instruction set, application, programmable controller, etc.) is identified at 420. The predetermined value may be of a variety of forms and can be associated with the amount of data each transaction sub-command should contain. It will be appreciated by those skilled in the art that the present invention is not requiring that each sub-command be of a set predetermined or predefined size, but rather that there is a preference of size that is being set forth under the process for any transaction may be of an overall size that may not be reduced equally into smaller sub-commands over the a preferential value.

A system and method in accordance with the present invention, in one or more embodiments, aligns transaction into a plurality of sub-commands at 430. The transactional sub-commands are generated using the preferential value. Once the MBB burst points are determined and the transaction sub-command data sizes are determined, an alignment of the transaction sub-commands with the MBB burst points is performed at 440 to provide for non-duplicative access to the data in the system memory. To prevent duplicative access to the system memory, a system and method in accordance with the present invention aligns transaction sub-command starting and ending break points with the determined MBB starting burst and ending burst points, while attempting to preserve the preferential predetermined transaction sub-command data size. In so doing, a system and method in accordance with the present invention aligns starting break points of one or more transaction sub-commands with starting burst points of a MBB. A system and method in accordance with the present invention also aligns ending break points of one or more transaction sub-commands with ending burst points of a MBB. A system and method in accordance with the present invention also determines the arrangement of the content for each transaction sub-command in relation to the overall original transaction command such that a remainder transaction sub-command block may be positioned as a first, last or other sequence-oriented block in the arrangement of the transaction sub-commands without limitation.

A system and method in accordance with the present invention, in one or more embodiments, then forwards the instructions based on the alignment or may communicate with a processor to further process the aligned sub-commands in association with the original transaction interests.

Figure 5:
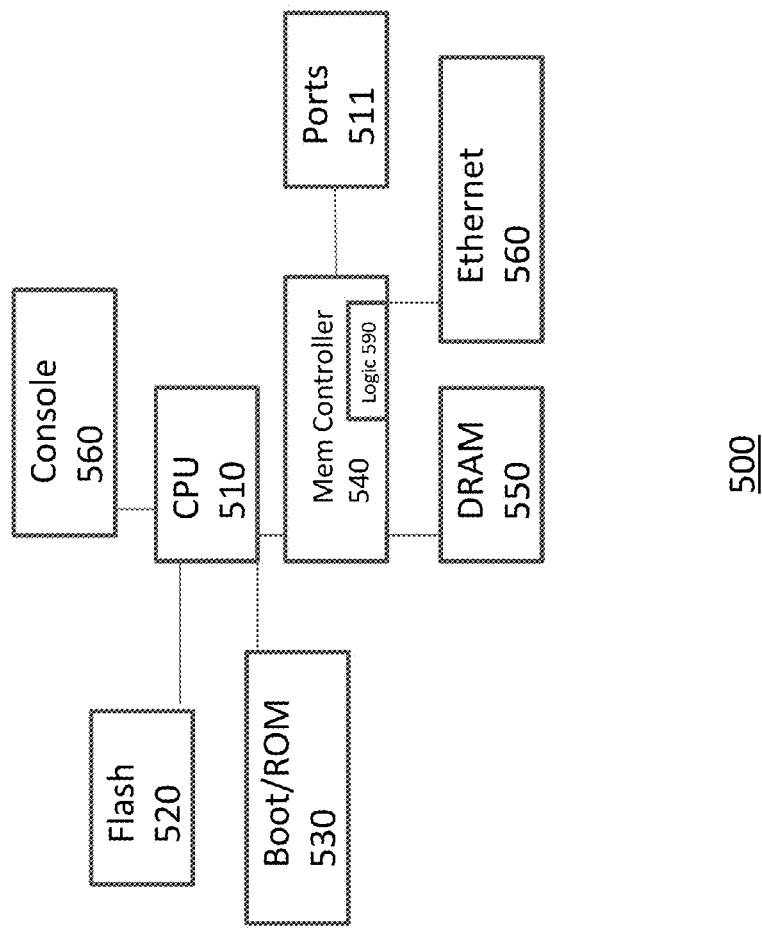
FIG. 5 is a block diagram of a system within which at least one embodiment of the present invention may be implemented.

FIG. 5 is a block diagram of a system within which at least one embodiment of the present invention may be implemented. FIG. 5 depicts a router using a system and method in accordance with the present invention, in which a central processing unit 510, memory controller 540 with logic 590 and DRAM 550 are operably arranged to communicate with one another to perform router oriented commands and transactions. Also present is a flash memory 520, a boot/read-only memory (ROM) 530, Ethernet port 560, other communication ports 511, and a console 560. The logic of the memory controller is programmable and preferably has an application to provide logic to operate the router using a system and method in accordance with the present invention. The logic is used to help the main processor with device control, interrupt handling, counting and timing, data transfer, minimal First In, First Out (FIFO) buffering, and communication with network interfaces and Dynamic RAM (DRAM). The logic 590 is able to perform the alignment operation of the present invention, in accordance for instance with FIG. 4, and then provide commands to the CPU 510, DRAM 550 and ports 510 to execute the aligned sub-commands. Preferably, the CPU, DRAM, local bus, and the peripherals connect to the motherboard.

Figure 6:
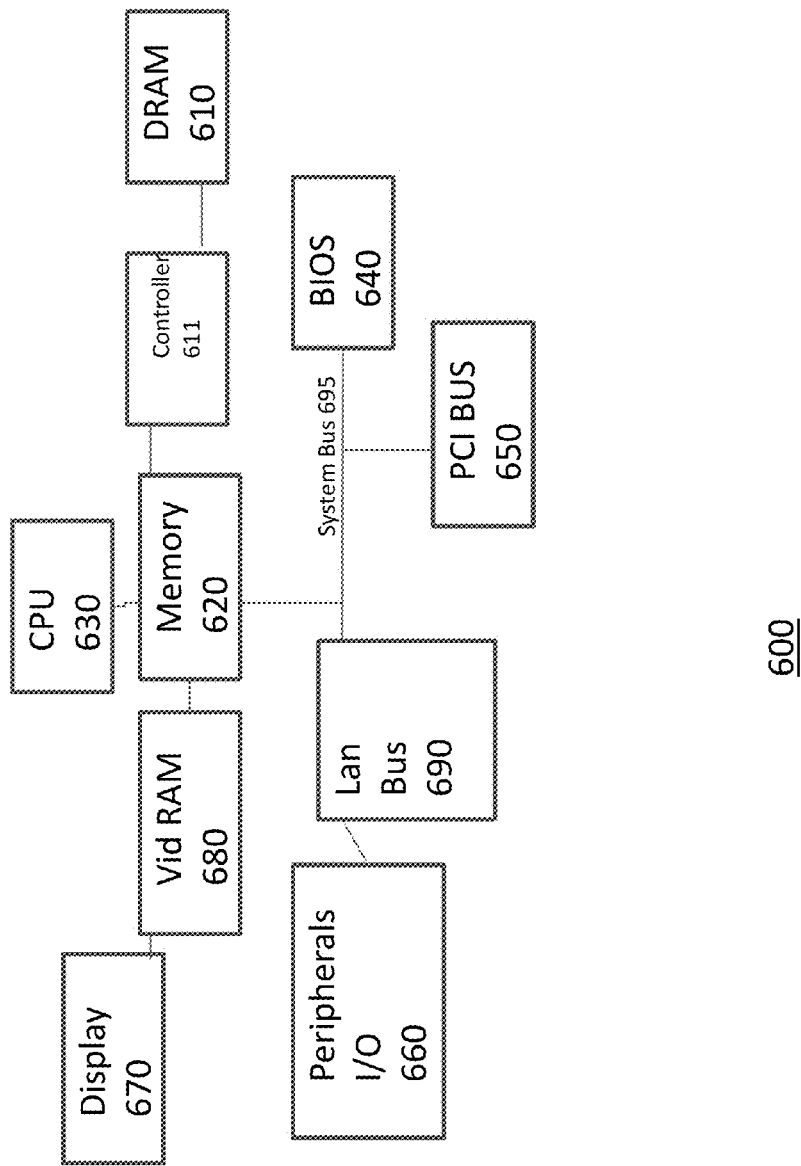
FIG. 6 is a block diagram of a computer with a DRAM using a system and method in accordance with the present invention.

FIG. 6 is a block diagram of a computer with a DRAM using the present invention. FIG. 6 depicts a personal computer (PC) orientation using the present invention, in which a central processing unit 630, memory 620, memory controller 611 with logic, and DRAM 610 are operably arranged to communicate with one another to perform commands and transactions. Also present is a video RAM memory 680 with a display 670 connection, peripherals and input/output devices 660 connected with a LAN Bus 690, BIOS 640, PCI BUS 650 and system bus 695. The logic of the memory controller is programmable and preferably has an application to provide logic to operate the PC using the present invention. The logic is able to perform the alignment operation of the present invention, in accordance for instance with FIG. 4, and then provide commands to execute the aligned sub-commands. The PC is one example of a memory device of the present invention.

It will be While such an approach may assist in reducing the system bus side bottleneck and offset the system-side demand for the shared memory for a single command, the approach creates additional challenges as each smaller 16-byte portion (i.e., smaller transaction portion block) now requires additional processing by the shared memory (i.e., duplicative accesses).

As used herein the term "break point" is intended to mean a point or address at which small transaction portion or sub-command block begins or ends. By example, from FIG. 1, a break point for SAA.A 151 depicts a starting point at address 9 and an ending point at address 25. Operationally, for a DDR3 memory natural memory break points are burst of 8 aligned and occur addresses 0x0, 0x7, 0xF, 0x10, 0x17, 0x1F, etc.

Although, a system and method in accordance with the present invention has set forth a number of embodiments which may discuss DRAM and DRAM-oriented devices, the present invention is not so limited. A system and method in accordance with the present invention contemplated and includes methods, applications, systems, apparatuses and memory devices in conjunction with other types of random access memories (RAM), such as static RAMs (SRAM) and the many different subspecies of DRAMs, including, by way of non-limiting examples, fast page mode DRAM (FPM DRAM), extended data out DRAM (EDO DRAM), burst EDO DRAM, synchronous DRAM (SDRAM), double data rate DRAM (DDR2 DRAM and DDR3 DRAM), Rambus DRAM (RDRAM), etc.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to one or more processors in one or more embodiments for execution.

What is claimed is:

1. A method for providing non-duplicative access to system memory data in a memory device having a processor, controller, and system bus capable of communication with one another to affect the execution of one or more data transactions for the device, comprising:
    creating a plurality of sub-commands for a transaction, wherein each sub-command having breaking points;
    identifying a plurality of memory burst boundaries for the system memory, wherein each burst boundary having burst boundary points of predetermined memory burst data size; and
    aligning a plurality of breaking points with a plurality of burst boundary points to provide single access to data located in the system memory.

2. The method of claim 1, further comprising identifying the system memory and associating a memory burst boundary size with the identified system memory as the predetermined memory burst data size.

3. The method of claim 2, further comprising identifying a predetermined transaction sub-command data size.

4. The method of claim 3, wherein the predetermined transaction sub-command data size is of a value in number of memory burst boundaries, beats or bytes.

5. The method of claim 3, wherein breaking points for each sub-command include a starting break point and an ending break point.

6. The method of claim 5, wherein burst boundary points for each memory boundary include a starting burst point and an ending burst point.

7. The method of claim 6, wherein the aligning includes aligning a starting break point of a first transaction sub-command with a starting burst point of a first memory burst boundary and aligning a starting break point of a second transaction sub-command with a starting burst point of a second memory burst boundary.

8. The method of claim 7, wherein the aligning further includes aligning an ending break point of a first transaction sub-command with an ending burst point of a first memory burst boundary and aligning an ending break point of a second transaction sub-command with an ending burst point of a second memory burst boundary.

9. A method for providing single access to data located in system memory comprising:
   identifying a transaction to be processed and reducing the transaction into a plurality of sub-commands where each sub-command has a starting break point and an ending break point;
   defining a predetermined transaction sub-command data size;
   identifying a plurality of memory burst boundaries in relation to a system memory where each memory burst boundary has a burst starting point and a burst ending point;
   aligning at least one or more starting breaking points with one or more burst starting points; and
   aligning at least one or more ending breaking points with one or more burst ending points to provide single access to data located in the system memory.

10. The method of claim 9, wherein the predetermined transaction sub-command data size is of a value in number of memory burst boundaries, beats or bytes.

11. The method of claim 10, wherein the aligning includes aligning a starting break point of a first transaction sub-command with a starting burst point of a first memory burst boundary and aligning a starting break point of a second transaction sub-command with a starting burst point of a second memory burst boundary.

12. The method of claim 11, wherein the aligning further includes aligning an ending break point of a first transaction sub-command with an ending burst point of a first memory burst boundary and aligning an ending break point of a second transaction sub-command with an ending burst point of a second memory burst boundary.

13. The method of claim 12, wherein the aligning further includes aligning a plurality of transaction sub-command with a plurality of memory burst boundaries where two or more of the transaction sub-commands are of a data size of the predetermined value.

14. A programmable controller configured for operable coupling to one or more requestors and one or more memory devices for providing non-duplicative access to system memory data for use by a memory controller of a memory device, the memory controller comprising processing means for:
   creating a plurality of sub-commands for a transaction each having breaking points;
   identifying a plurality of memory burst boundaries for the system memory each having burst boundary points of predetermined memory burst data size; and
   aligning a plurality of breaking points with a plurality of burst boundary points to provide single access to data located in the system memory.

15. The controller of claim 14, wherein two or more transaction sub-commands are of a predetermined transaction sub-command data size.

16. The controller of claim 15, wherein the predetermined transaction sub-command data size is of a value in number of memory burst boundaries, beats or bytes.

17. The controller of claim 16, wherein the aligning includes aligning a starting break point of a first transaction sub-command with a starting burst point of a first memory burst boundary and aligning a starting break point of a second transaction sub-command with a starting burst point of a second memory burst boundary.

18. The controller of claim 17, wherein the aligning further includes aligning an ending break point of a first transaction sub-command with an ending burst point of a first memory burst boundary and aligning an ending break point of a second transaction sub-command with an ending burst point of a second memory burst boundary.

19. The controller of claim 18, wherein the aligning further includes aligning a plurality of transaction sub-command with a plurality of memory burst boundaries where two or more of the transaction sub-commands are of a data size of the predetermined value.

20. A non-transitory computer program product stored on a computer usable medium capable of communication with a memory device, comprising computer readable program means for causing a computer to provide non-duplicative access to data located in system memory comprising:
   identifying a transaction to be processed and reducing the transaction into a plurality of sub-commands where each sub-command has a starting break point and an ending break point;
   identifying a plurality of memory burst boundaries in relation to a system memory where each memory burst boundary has a burst starting point and a burst ending point;
   aligning at least one or more starting breaking points with one or more burst starting points; and
   aligning at least one or more ending breaking points with one or more burst ending points to provide single access to data located in the system memory.

21. The program product of claim 20, wherein two or more transaction sub-commands are of a predetermined transaction sub-command data size.

22. The program product of claim 21, wherein the predetermined transaction sub-command data size is of a value in number of memory burst boundaries, beats or bytes.

23. The program product of claim 22, wherein the aligning includes aligning a starting break point of a first transaction sub-command with a starting burst point of a first memory burst boundary and aligning a starting break point of a second transaction sub-command with a starting burst point of a second memory burst boundary.

24. The program product of claim 23, wherein the aligning further includes aligning an ending break point of a first transaction sub-command with an ending burst point of a first memory burst boundary and aligning an ending break point of a second transaction sub-command with an ending burst point of a second memory burst boundary.

25. A memory device comprising:
   a processor;
   memory controller;
   system memory; and system bus capable of communication with one another to affect the execution of one or more data transactions for the device for non-duplicative access to system memory data in the device, wherein the memory controller includes programmable computer logic to comprising the steps of:

identifying a transaction to be processed and reducing the transaction into a plurality of sub-command portions where each sub-command portion has a starting break point and an ending break point;

identifying a plurality of memory burst boundaries in relation to a system memory where each memory burst boundary has a burst starting point and a burst ending point being of a predetermined memory burst data size;

aligning at least one or more starting breaking points with one or more burst starting points; and aligning at least one or more ending breaking points with one or more burst ending points to provide single access to data located in the system memory.

26. The device of claim 25, wherein two or more sub-command portions are of a predetermined transaction sub-command data size.

27. The device of claim 26, wherein the predetermined transaction sub-command data size is of a value in number of memory burst boundaries, beats or bytes.

28. The device of claim 27, wherein the aligning includes aligning a starting break point of a first transaction sub-command with a starting burst point of a first memory burst boundary and aligning a starting break point of a second transaction sub-command with a starting burst point of a second memory burst boundary.

29. The device of claim 28, wherein the aligning further includes aligning an ending break point of a first transaction sub-command with an ending burst point of a first memory burst boundary and aligning an ending break point of a second transaction sub-command with an ending burst point of a second memory burst boundary.

30. The device of claim 29, wherein the device is a router.

31. The device of claim 29, wherein the device is a personal computer.

* * * * *